(12) United States Patent
DeLuca et al.

(10) Patent No.: US 10,674,012 B2
(45) Date of Patent: *Jun. 2, 2020

(54) PREEMPTIVE RESPONSES BASED ON SERVICE AVAILABILITY

(71) Applicant: International Business Machines Corporation, Armonk, NY (US)

(72) Inventors: Lisa Seacat DeLuca, Baltimore, MD (US); Shelbee D. Eigenbrode, Thornton, CO (US); Dana L. Price, Surf City, NC (US); Aaron J. Quirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,786

(22) Filed: Jun. 21, 2019

(65) Prior Publication Data
US 2019/0312972 A1 Oct. 10, 2019

Related U.S. Application Data

(63) Continuation of application No. 15/823,761, filed on Nov. 28, 2017, now Pat. No. 10,404,855.

(51) Int. Cl.
*H04M 3/42* (2006.01)
*H04L 12/24* (2006.01)
(Continued)

(52) U.S. Cl.
CPC .... *H04M 3/42374* (2013.01); *H04L 41/5012* (2013.01); *H04W 4/12* (2013.01); *H04W 8/24* (2013.01); *G06Q 10/107* (2013.01)

(58) Field of Classification Search
CPC . H04M 3/42374; H04L 41/5012; H04W 4/12; H04W 8/24; G06Q 10/107
(Continued)

(56) References Cited

U.S. PATENT DOCUMENTS 6,192,240 B1 2/2001 Tayloe et al.
7,373,144 B1 * 5/2008 Kirkpatrick ............. H04L 51/14
455/421

(Continued)

OTHER PUBLICATIONS

Mong-Thuy Thi Tran, USPTO Office Action, U.S. Appl. No. 15/823,761, dated Jul. 26, 2018, 18 pages.
(Continued)

*Primary Examiner* — Mong-Thuy T Tran
(74) *Attorney, Agent, or Firm* — Michael A. Petrocelli; Maxine L. Barasch; Keohane & D'Alessandro PLLC

(57) ABSTRACT

Disclosed embodiments provide techniques for generating an electronic communication response for a mobile electronic device in an offline state. A communication server detects various offline conditions, such as explicitly powered off, low/dead battery, dead zone location, and/or other reasons. A sending electronic device, attempting to establish communication with a receiving electronic device that is offline receives an automated reply message from the communication server, indicating that the intended receiving electronic device is offline. In embodiments, an estimated online restoration time for the receiving electronic device is derived and included in the automated reply message. Additionally, a reason for the offline condition such as explicitly powered off, low/dead battery, dead zone location, and/or other reason may also be included in the automated reply message.

20 Claims, 8 Drawing Sheets

(51) Int. Cl.
*H04W 8/24* (2009.01)
*H04W 4/12* (2009.01)
*G06Q 10/10* (2012.01)

(58) Field of Classification Search
USPC ..................................................... 455/414.1
See application file for complete search history.

(56) References Cited

U.S. PATENT DOCUMENTS

| | | | |
|---|---|---|---|
| 7,383,055 | B2 | 6/2008 | Eason et al. |
| 8,495,660 | B1 * | 7/2013 | Hernacki ................ H04L 51/08 |
| | | | 719/313 |
| 2003/0120732 | A1 | 6/2003 | Couts et al. |
| 2004/0259569 | A1 | 12/2004 | Eason et al. |
| 2006/0129367 | A1 | 6/2006 | Mishra et al. |
| 2008/0108330 | A1 | 5/2008 | O'Neil et al. |
| 2009/0077185 | A1 | 3/2009 | Chiu et al. |
| 2010/0254525 | A1 | 10/2010 | Maly et al. |
| 2011/0035453 | A1 | 2/2011 | Koul et al. |
| 2011/0258276 | A1 | 10/2011 | Robins |
| 2013/0150004 | A1 * | 6/2013 | Rosen .................... H04W 8/22 |
| | | | 455/414.1 |
| 2015/0312731 | A1 | 10/2015 | Bendi et al. |
| 2015/0381805 | A1 | 12/2015 | Guedalia et al. |
| 2016/0314318 | A1 | 10/2016 | Li et al. |
| 2017/0214794 | A1 * | 7/2017 | Bostick ............. H04M 3/42365 |

OTHER PUBLICATIONS

Mong-Thuy Thi Tran, USPTO Final Office Action, U.S. Appl. No. 15/823,761, dated Dec. 31, 2018, 13 pages.

Mong-Thuy Thi Tran, USPTO Notice of Allowance and Fees Due, U.S. Appl. No. 15/823,761, dated Mar. 22, 2019, 16 pages.

\* cited by examiner

PREEMPTIVE RESPONSES BASED ON SERVICE AVAILABILITY

RELATED APPLICATION DATA

The present patent document is a continuation of U.S. patent application Ser. No. 15/823,761, filed Nov. 28, 2017, entitled "PREEMPTIVE RESPONSE BASED ON SERVICE AVAILABILITY", the entire contents of which is incorporated herein by reference.

FIELD OF THE INVENTION

Embodiments of the invention relate to systems and methods of generating preemptive responses based on service availability.

BACKGROUND

Communication via electronic devices today occurs via smartphones, tablet computers, and other electronic mobile devices. Such devices may go offline for a variety of reasons, leaving the sender of a message to the device to wonder whether the receiving user device ever received the message. For example, electronic communication devices may be shut off intentionally. They may shut off due to a battery running low, or running out of power. In some cases, they may be powered on, but still unable to receive incoming or send outgoing communications for being out of range of a WiFi, cellular connection, etc., or in a dead zone. When a receiving user's device is offline, the sending user may have to wait indefinitely for a reply or to follow up with the receiving user. This has many negative implications, including, for example, frustration on the part of the sending user, loss of opportunities on the part of the receiving user (when the sending user moves on), etc. Accordingly, there exists a need for improvements in electronic communication technologies.

SUMMARY

In one aspect, there is provided a computer-implemented method for generating an electronic communication response, comprising: determining an offline state of a receiving electronic device; receiving a communication request from a sending electronic device that is destined for the receiving electronic device; and sending an automated reply message to the sending electronic device, wherein the automated reply message includes the offline state of the receiving electronic device.

In another aspect, there is provided an electronic communication device comprising: a processor; a memory coupled to the processor, the memory containing instructions, that when executed by the processor, perform the steps of: determining an offline state of a receiving mobile electronic device; receiving a communication request from a sending mobile electronic device that is destined for the receiving mobile electronic device; sending an automated reply message to the sending mobile electronic device, wherein the automated reply message includes the offline state of the receiving mobile electronic device.

In yet another aspect, there is provided a computer program product for an electronic communication device comprising a computer readable storage medium having program instructions embodied therewith, the program instructions executable by a processor to cause the electronic communication device to: determine an offline state of a receiving mobile electronic device; receive a communication request from a sending mobile electronic device that is destined for the receiving mobile electronic device; and send an automated reply message to the sending mobile electronic device, wherein the automated reply message includes the offline state of the receiving mobile electronic device.

BRIEF DESCRIPTION OF THE DRAWINGS

Features of the disclosed embodiments will be more readily understood from the following detailed description of the various aspects of the invention taken in conjunction with the accompanying drawings.

Figure 1:
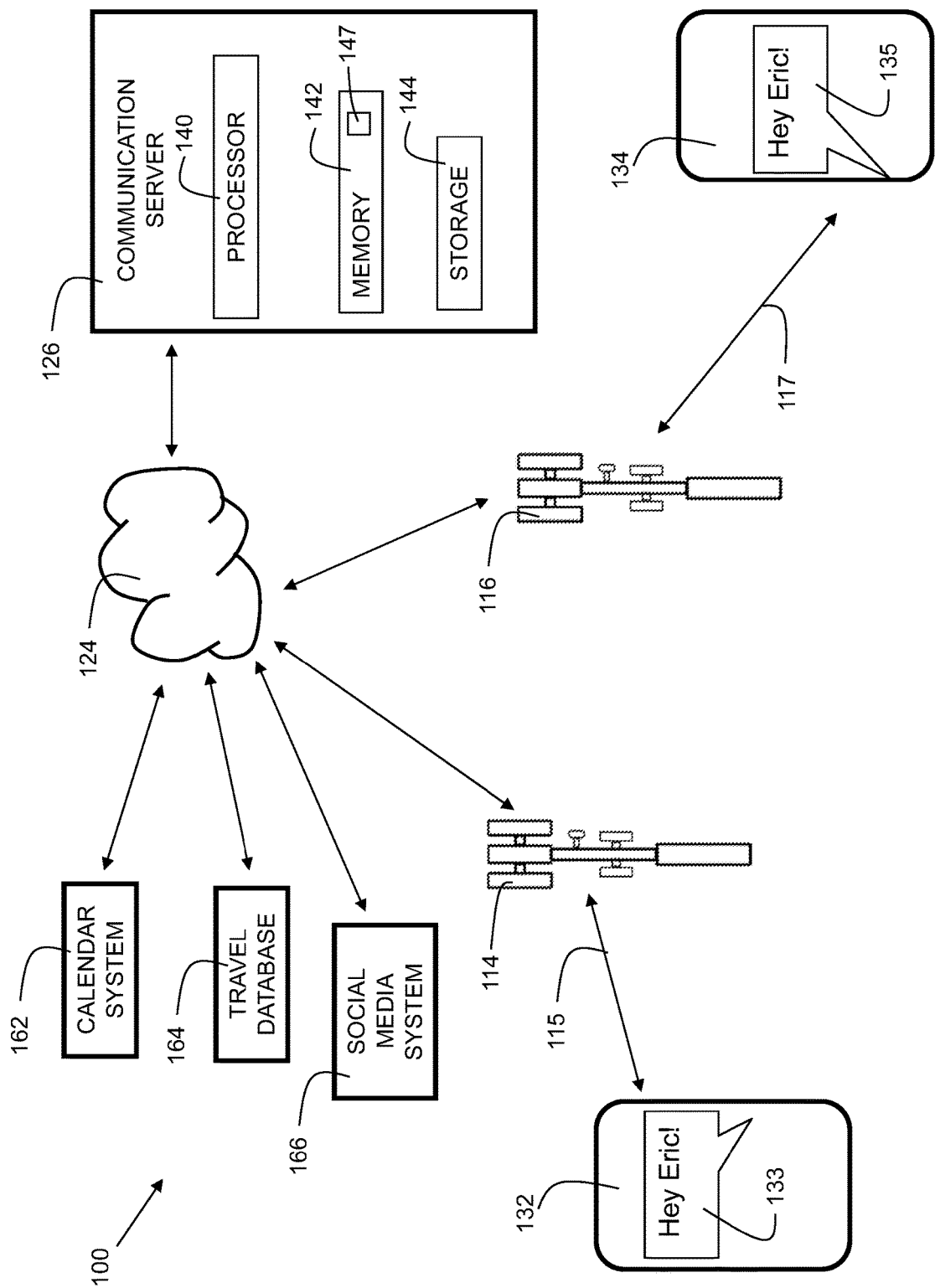
FIG. 1 is a diagram illustrating an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for generating an electronic communication response for a mobile electronic device in an offline state. A communication server detects various offline conditions, such as explicitly powered off, low/dead battery, dead zone location, and/or other reasons. A sending electronic device, attempting to establish communication with a receiving electronic device that is offline receives an automated reply message from the communication server, indicating that the intended receiving electronic device is offline. In embodiments, an estimated online restoration time for the receiving electronic device is derived and included in the automated reply message. Additionally, a reason for the offline condition such as explicitly powered off, low/dead battery, dead zone location, and/or other reason may also be included in the automated reply message.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a diagram 100 illustrating an environment for embodiments of the present invention. Communication server 126 comprises processor 140, memory 142, and storage 144. Instructions 147 for executing embodiments of the present invention are shown stored in memory 142. Server 126 is in communication with network 124. In embodiments, network 124 may be the Internet, a wide area network (WAN), a local area network (LAN), a cloud network, or any other suitable network. In embodiments, server 126 may monitor communications from client devices associated with a given service provider. Examples of such a service provider include Verizon® and Sprint®. The routing of network traffic between two clients may be performed by a variety of network equipment, including, but not limited to, routers, switches, and/or load balancers.

A calendar system 162, travel database 164, and social media system 166 are also in communication with network 124. Calendar system 162 may be a set of (one or more) computers hosting a calendaring software system and database. It may process and store calendar information of one or more users, which may provide indications of when a user is in meetings, travelling, etc. (i.e. information that can be used to infer time ranges when the user's mobile device is expected to be offline, such as during a flight on a commercial airline). Travel database 164 may be a set of computers hosting a travel reservation system and database. The travel database may be owned or managed by a travel-related company, such as a travel agency, an airline, a hotel, etc. Social media system 166 may be a set of computers that provide a social media network. Examples of a social media network include Facebook®, Twitter®, LinkedIn®, etc. Various users may post and upload information to a social network, which may provide an indication of when a user may be away from his/her phone.

Client devices 132 and 134, and cellular towers 114 and 116 are in communication with network 124. Client devices can be smartphones, tablet computers, laptop computers, desktop computers, a combination thereof, or other suitable devices. First client device 132 is in communication with first cell tower 114, as represented by arrow 115. Second client device 134 is in communication with second cell tower 116, as represented by arrow 117.

Embodiments of the present invention provide a computer-implemented method for generating an electronic communication response. In the process, a communication request is received from a sending electronic device 132 that is destined for the receiving electronic device 134. The communication request is shown on sending device 132 as message 133, and on receiving device 134 as message 135. In embodiments, receiving a communication request comprises receiving a voice call, a text message, or an instant chat message. Any communication type now known or hereafter developed may be used.

Figure 5:
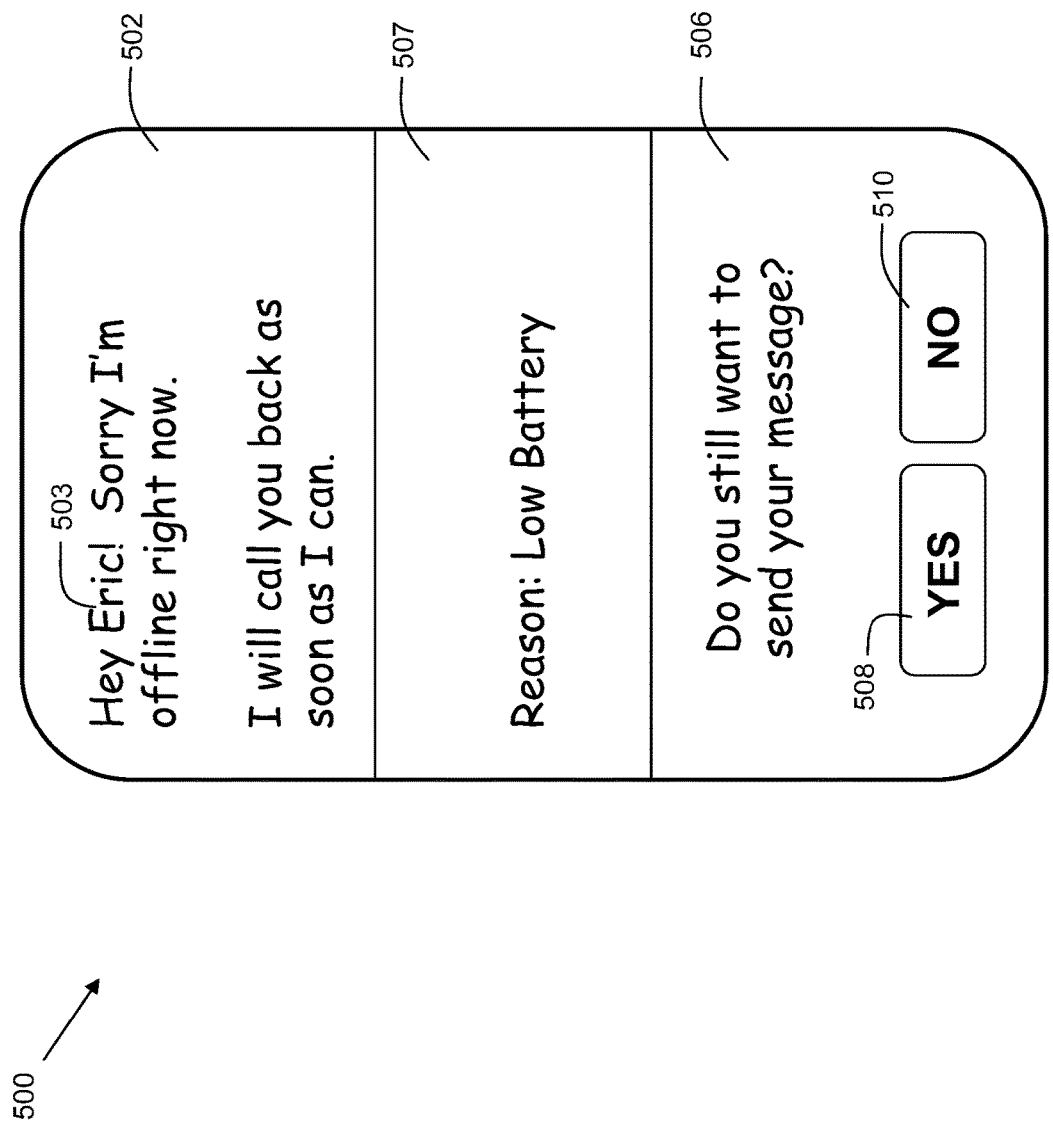
FIG. 5 illustrates an exemplary customized automated reply message on a sending electronic device.

An offline state of a receiving electronic device 134 is determined. In some embodiments, an offline state is determined based on a low battery condition of the receiving electronic device. Embodiments can infer that the battery is low is the reason for the device being offline. It may be deduced that the device powered off without user intervention because the battery had run out. The low battery condition can be included in the automated reply message as the reason for being offline, as shown at 504 (FIG. 5).

In some embodiments, an offline state of a receiving electronic device 134 is determined based on an intentional off condition of the receiving electronic device (i.e. the device was turned off by an on/off power switch API). When a phone is intentionally shut down by the user, a message can automatically be sent to the server indicating that the phone was intentionally shut down. An intentional shut down condition can be included in the automated reply message as the reason for being offline.

Some embodiments may include determining an offline state based on an out-of-range condition. A periodic "heartbeat" or "keepalive" message may be used that each client sends to the communication server 126. If a reply message is not received back from the device after a predetermined time threshold, it is inferred that the device is out of range. For example, server 126 may send a message to an electronic device 134 every 60 seconds. If a reply from device 134 is not received, then it may be inferred that the electronic device 134 is out of range.

Embodiments estimate an online restoration time for the receiving electronic device 134. In some embodiments, estimating an online restoration time for the receiving electronic device 134 comprises identifying an estimated repair time from a service provider. For example, if a service provider is aware of a particular outage due to downed wires or other signal disruption, and the service provider has assessed the damage, the service provider may then derive an estimated repair time based on the assessed damage. The estimated repair time is then assigned to the estimated online restoration time.

In other embodiments, estimating an online restoration time for the receiving electronic device comprises identifying a travel schedule for a user associated with the receiving electronic device, and identifying an arrival time from the travel schedule. An entry on a user's calendar or in an electronic itinerary may indicate that a user has a flight scheduled for a particular time, and that the flight is a particular length of time. The arrival time is then assigned to the estimated online restoration time.

These are examples of methods of estimating an online restoration time, and not meant to be limiting. Any suitable process of estimating an online restoration time is included within the scope of the invention.

The estimated online restoration time is sent in an automated reply message to the sending electronic device 132. In some embodiments, the estimated online restoration time sent to the sending device 132 may be adjusted based on time zone. For example, if the receiving device 134 is in the U.S. Central Time zone and the sending device 132 is in the U.S. Eastern Time zone, then the estimated online restoration time included in the automated reply message may be shown in U.S. Eastern Time clock time rather than U.S. Central time. In this way, the sender is informed about when the user will likely be online again in his/her local time.

Sending the estimated online restoration time provides many advantages. From the estimated online restoration time, the sending user can understand when s/he may expect to hear back from the receiving user (since the receiving user won't see the sent message until his/her device is back online), when to follow up on the message to the receiving device, when to send another message to the receiving device, etc.

In some embodiments, it is determined that an in-progress communication status exists. This means that a user is on a voice call, participating in a live chat session, or otherwise occupied on the electronic device. In such embodiments, the sending of the automated reply message is performed responsive to the determination of the in-progress communication status. The determination of the "in-progress" status may be made, for example, based on the time of the last received message. If it was less than a predetermined threshold (e.g., five minutes), the session is in progress. Alternatively, or in addition, natural language processing may be used to determine that the chat session has ended (e.g. detecting "TTYL" or "bye" as the most recent message. For a voice call, the determination may be made based on a detection that the phone line is in use.

Figure 2:
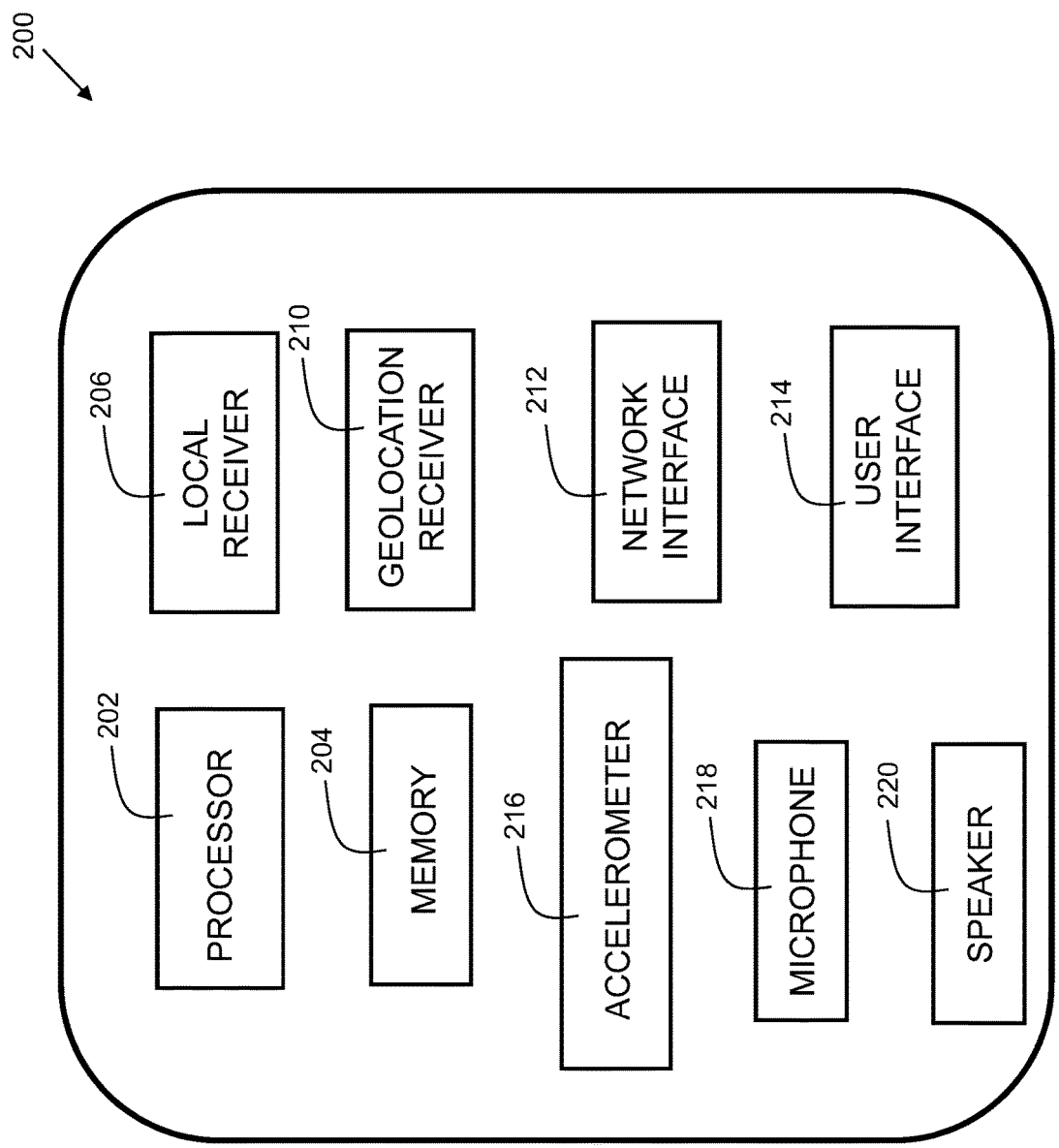
FIG. 2 is a device in accordance with embodiments of the present invention.

FIG. 2 is a client device in accordance with embodiments of the present invention. Device 200 is shown as a simplified diagram of modules. Device 200 is an electronic communication device, such as a smartphone, or other mobile electronic device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include a local receiver 206. The local receiver 206 includes a receiver for local radio frequency (RF) signals. In embodiments, the local receiver may include a Bluetooth® receiver, ZigBee® receiver, or other near field communication (NFC) receiver.

Device 200 further includes a geolocation receiver 210. The geolocation receiver may be configured to receive signals from multiple satellites to triangulate a position on Earth. In embodiments, the geolocation receiver 210 includes a Global Positioning System (GPS) receiver, GLONASS receiver, Galileo receiver, or other satellite-based positioning system.

Mobile device 200 further includes a network interface 212. Network interface 212 may include a cellular network interface, a WiFi interface, such as an IEEE 802.11 interface, or other suitable network interface.

The mobile device 200 further includes an accelerometer 216, which may be used to detect motion of the mobile device, and may serve in the role of location assessment using inertial navigation techniques.

Device 200 further includes a user interface 214. In some embodiments, the user interface may be a display, examples of which include a liquid crystal display (LCD), a plasma display, a cathode ray tube (CRT) display, a light emitting diode (LED) display, an organic LED (OLED) display, or other suitable display technology. The user interface 214 may include a keyboard, mouse, and/or a touch screen, incorporating a capacitive or resistive touch screen in some embodiments.

In embodiments, the device 200 further includes a microphone 218 and a speaker 220.

It should be recognized that the modules shown herein for device 200 are examples. In embodiments, more or fewer may be included as feasible for the device.

Figure 3:
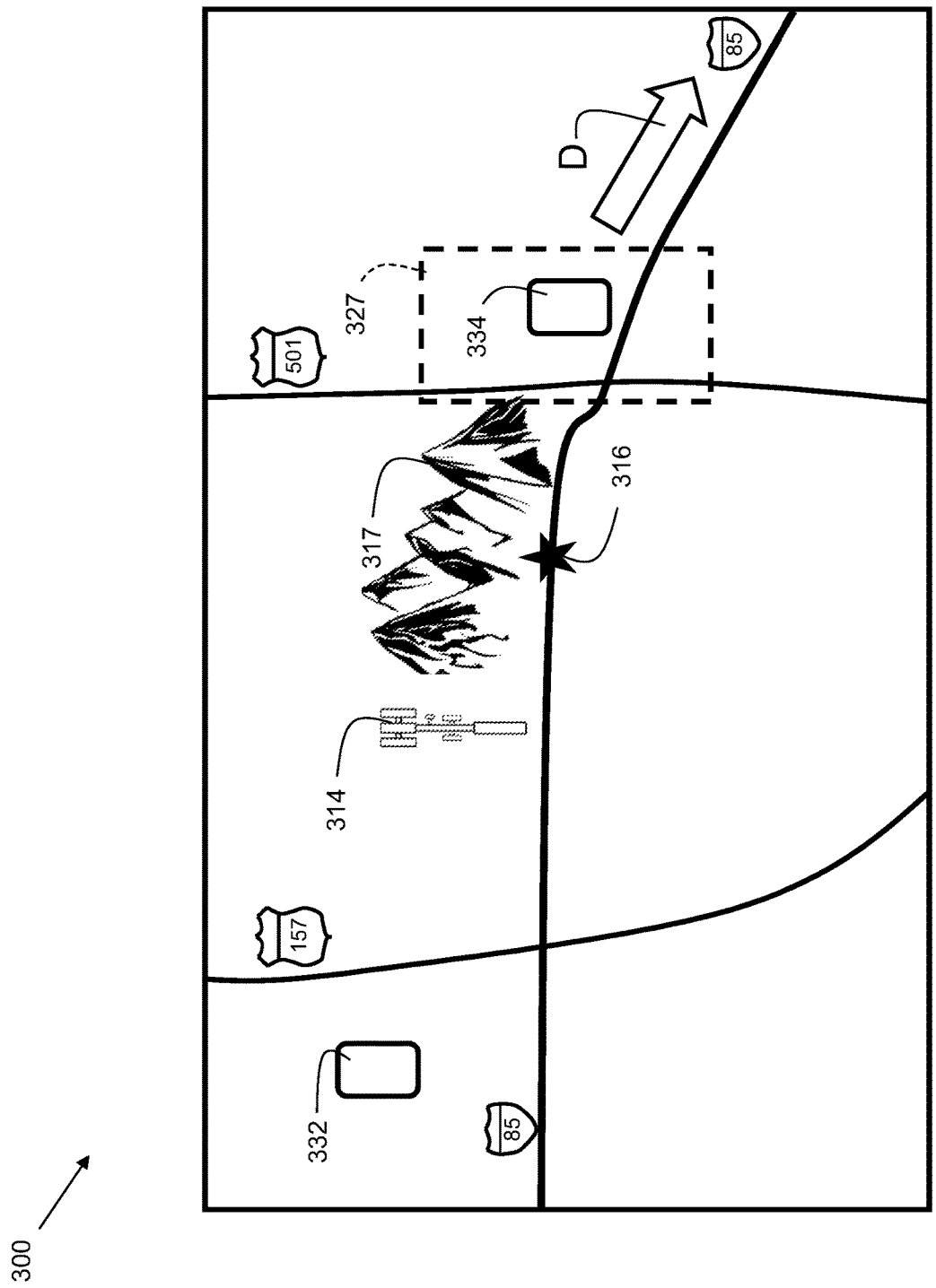
FIG. 3 illustrates an example of performing a dead reckoning computation to determine a service reentry time.

FIG. 3 illustrates an example 300 of performing a dead reckoning computation to determine a service reentry time. Embodiments may estimate when device 334, based on motion, is likely to exit a dead zone. A user may opt in for this type of service. In some embodiments, an online restoration time for the receiving electronic device may be based on a dead reckoning computation. A last-known geographical location of the receiving mobile electronic device is identified. A last-known travel speed of the receiving mobile electronic device is determined. A dead reckoning computation is performed to determine a service reentry time. The service reentry time is assigned to the estimated online restoration time.

In the example, a user is in his car traveling east on I-85 highway in direction "D". The user has his device 334 in his pocket. While driving, the user entered a "dead zone" 327 with no service. Mountains 317 are between the tower 314 and the device 334, causing the dead zone. A sending device 332 sends a message to receiving device 334. Embodiments may determine that the last known speed of the device is 60 mph, and the last known geographic location was coordinates corresponding to location 316. Based on that information, embodiments calculate an estimated period of time that it will take until the device will emerge from the dead zone 327 and be back online. Embodiments may send a message to the sending electronic device 332 indicating that the receiving electronic device 334 is offline and estimated to be back online at a future time (e.g., 20 minutes).

Embodiments may estimate when device 334, based on motion, is likely to enter the dead zone 327. A user may opt in for this type of service. Using the speed of the user's vehicle, the location of the user's vehicle, and the location of the dead zone, the time it will take to enter and/or exit the dead zone can be calculated.

Figure 4:
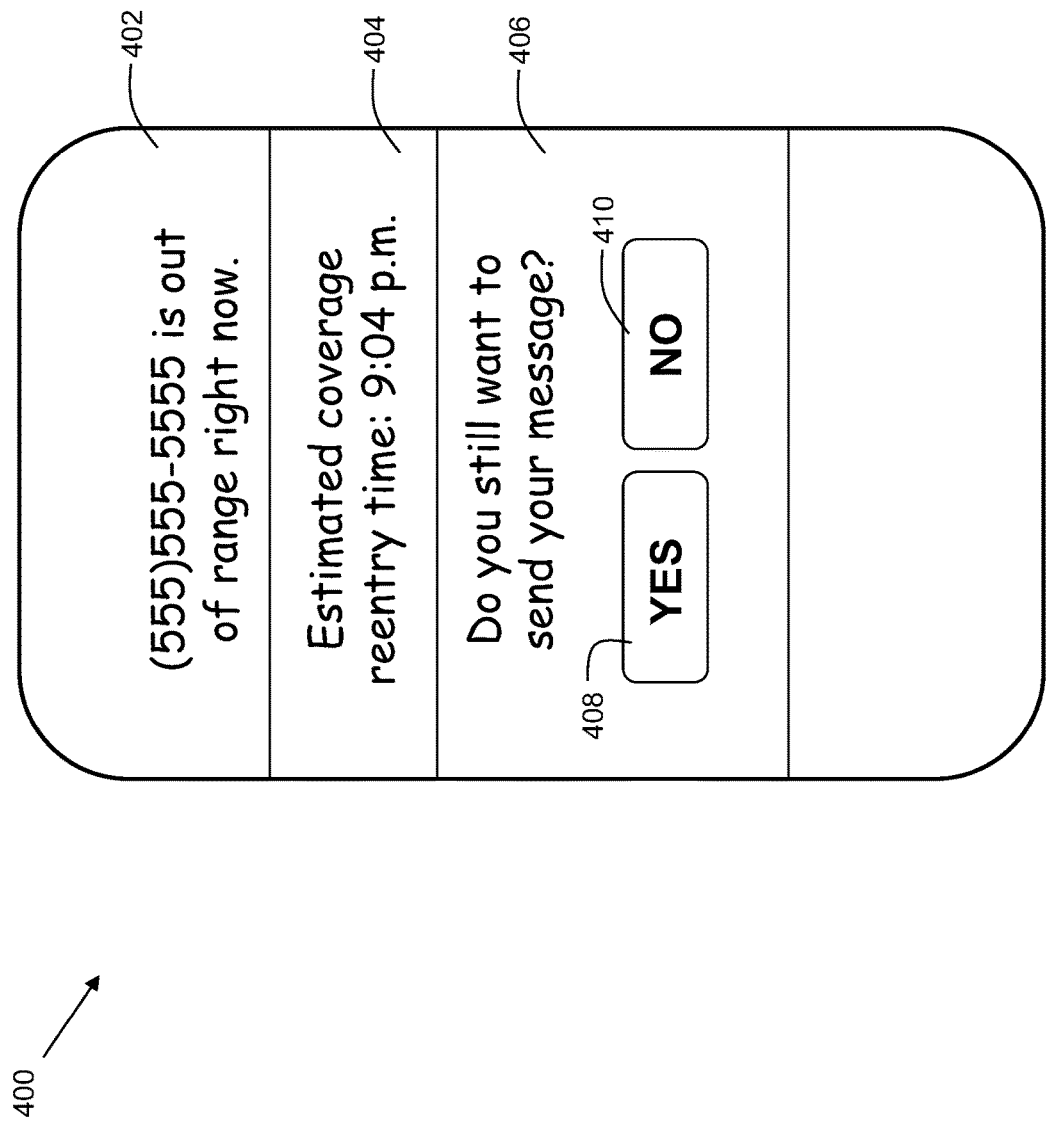
FIG. 4 illustrates an exemplary automated reply message on a sending electronic device.

FIG. 4 illustrates an exemplary automated reply message 400 on a sending electronic device. This is an example of a message a sending electronic device may receive when attempting to communicate with a receiving electronic device that is currently offline. At 402, there is an indication that the receiving device, identified by its phone number, is offline right now. At 404, there is an indication of the estimated online restoration time. In the example, the estimated online restoration time is 9:04 p.m. In some embodiments, rather than a particular time, the amount of time until the phone is estimated to be back online may be substituted, such as (e.g., 30 minutes). At 406, there is shown an option for aborting or sending the sender message. Embodiments can include providing an option for aborting a sender message from being sent to an offline recipient. Embodiments can include providing an option for a sender message to be sent to the recipient even though the recipient is currently offline. Here, the option for sending can be executed by the user pressing the electronic "yes" 408 button. The option for aborting can be executed by the user pressing the electronic "no" button 410.

FIG. 5 illustrates an exemplary customized automated reply message 500 on a sending electronic device. This is an example of a message a sending electronic device may receive when attempting to communicate with a receiving electronic device that is currently offline. In some embodiments, various customizations may be set by the user for the automated reply message. A user of the receiving device may set particular settings ahead of time using a user interface.

In some embodiments, the indication that the receiving device is offline may be customized. A user may select the exact wording of the indication using radio buttons with pre-written message options or by entry into a field. In the example, he selected, "Sorry I'm offline right now. I will call you back as soon as I can." as shown at 502. A user may also select that a name be associated with the reply message. In such a case, the phone number of the sender device may be compared to the contact list of the receiving device. If a matching contact entry is found, the name associated with the entry may be added to the reply message. In the example, "Eric" at 503 is the associated name.

In some embodiments, the recipients of a customized reply message may be specified. A user may select a subset of contacts to which an automated reply message is to be sent. For privacy reasons, a user may not want an automated reply to go to anyone that contacts him. The user may want a custom message sent only if the sender device is a member of his family or friends. The user may select a subset of contacts to which a customized message is sent when the user is offline. Accordingly, the customized message may only be sent if the sender of the original message is associated with the subset of contacts selected by the user from the set of contacts in his device.

In embodiments, the customized message can include an estimated online restoration time, such as indicated as 404 (FIG. 4). It may further include a reason for the offline state at 507. In the example, the reason is that a low battery condition is detected.

At 506, there is shown an option for aborting or sending the sender message. Embodiments can include providing an option for aborting a sender message from being sent to an offline recipient. Embodiments can include providing an option for a sender message to be sent to the recipient even though the recipient is currently offline. Here, the option for sending can be executed by the user pressing the electronic "yes" 508. The option for aborting can be executed by the user pressing the electronic "no" button 510.

Figure 6:
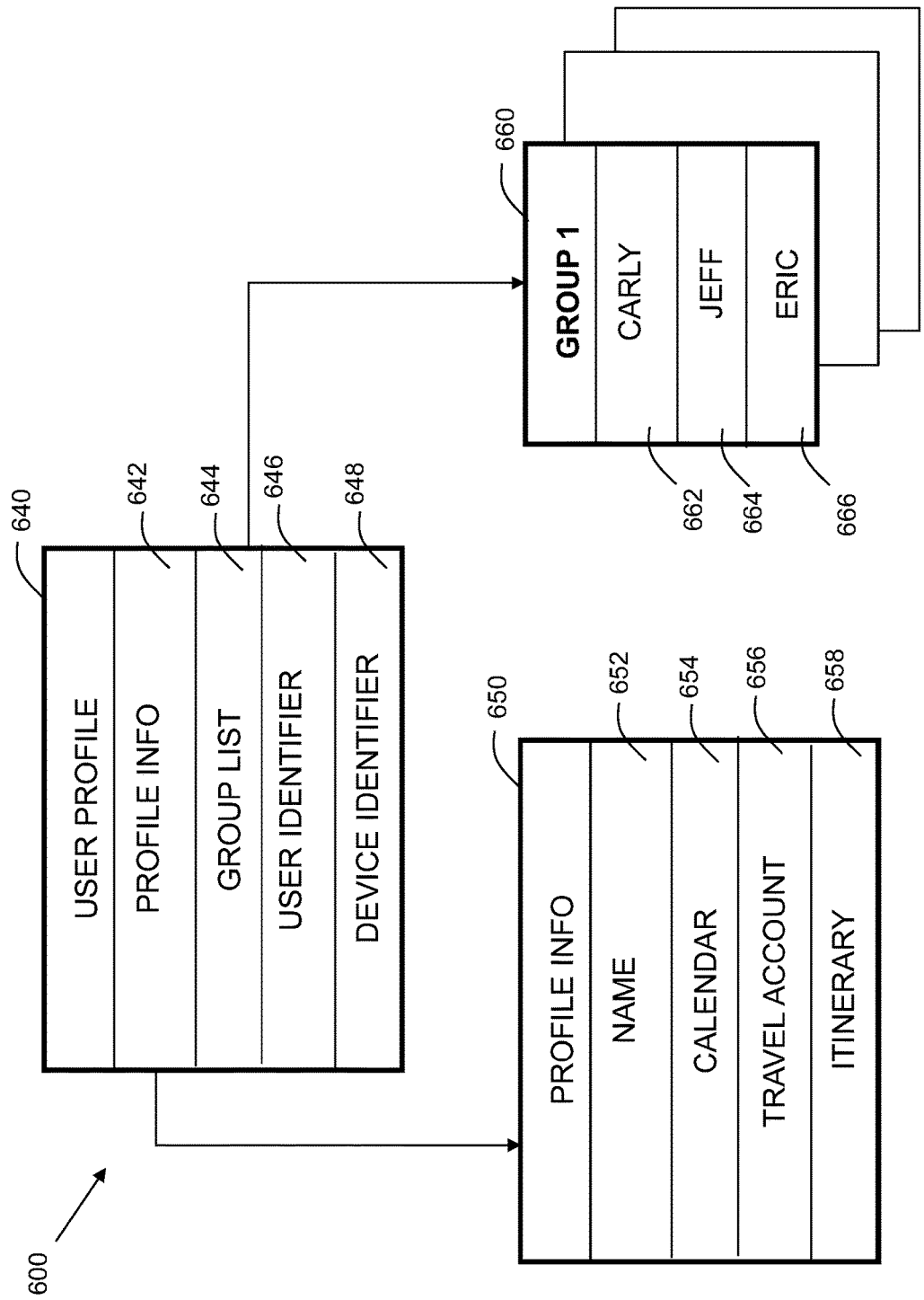
FIG. 6 illustrates an example set of database tables for embodiments of the present invention.

FIG. 6 illustrates an example set of data tables 600 for embodiments of the present invention. Data table 640 stores data associated with a user profile. Field 642 links to profile information data table 650. Field 644 links to a group list data table 660. Field 646 stores a user identifier. Field 648 stores a device identifier. Data table 650 stores data associated with profile information. Field 652 stores the user's name. Field 654 stores calendar information of the user. Field 656 stores the user's credentials and a link to a user's travel account, for example, with an airline's computer system. Field 658 stores itinerary information. Data table 660 stores identifiers (e.g., names of the subset of contacts to which an automated reply message may be sent). In the example, field 662 stores Carly's contact information, field 664 stores Jeff's contact information, and field 666 stores Eric's contact information.

Figure 7:
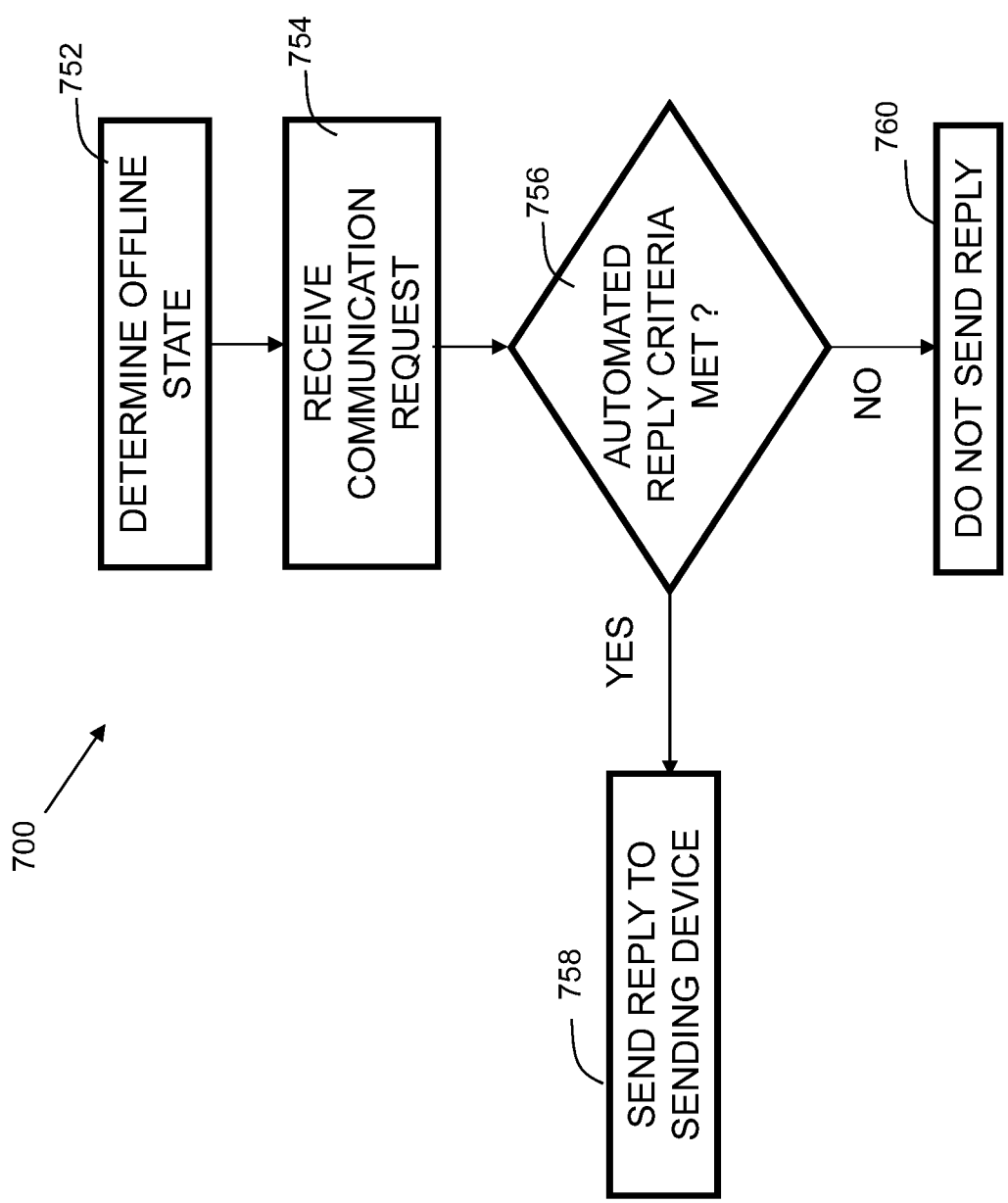
FIG. 7 is a flowchart indicating process steps for embodiments of the present invention.

FIG. 7 is a flowchart 700 indicating process steps for embodiments of the present invention. At 752, it is determined that a first device is in an offline state. In embodiments, the offline state is detected by the communication server not receiving a keepalive message after a predetermined duration (e.g., 120 seconds). At 754, a communication request is received from a second device. At 756, it is determined whether automated reply criteria are met. These criteria may be user-selected. For example, a user can set that a reply is only sent when the phone number of the second device is included in the contact list of the user's first device. If yes, then at 758, a reply is sent to the second device. If not, then at 760, a reply is not sent. In some embodiments, steps 756 and 760 are not included. In such embodiments, the reply is sent to the second device in response to receipt of the communication request by the communication server.

Figure 8:
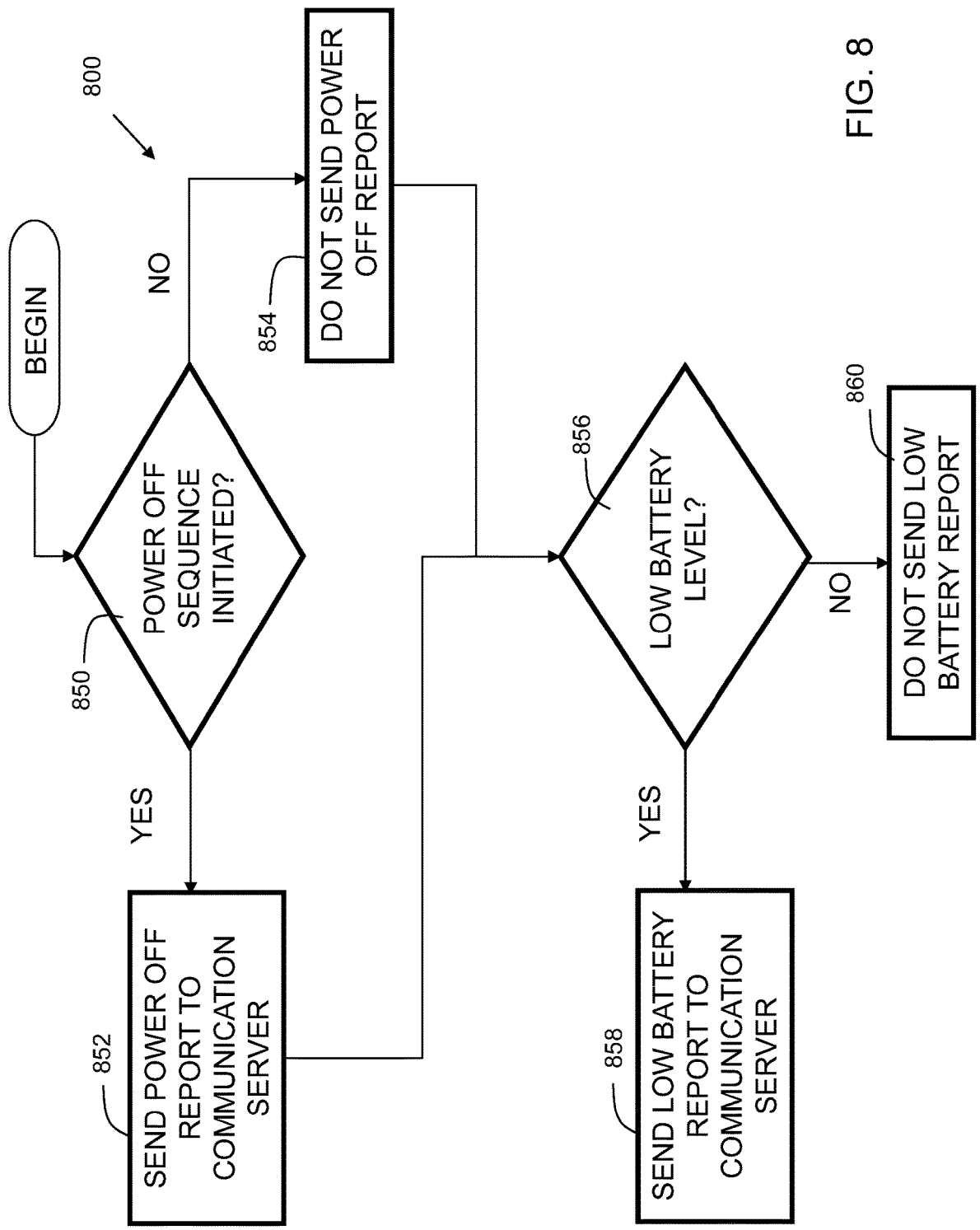
FIG. 8 is a flowchart indicating process steps for determining an offline state of a receiving electronic device in accordance with embodiments of the present invention.

FIG. 8 is a flowchart 800 indicating process steps for determining an offline state of a receiving electronic device in accordance with embodiments of the present invention. In some embodiments, determining an offline state comprises discerning between an intentional off condition or low battery condition of the receiving electronic device. Accordingly, at 850, it is determined whether a power-off sequence is initiated. If yes, at 852, a power off report communication is sent to a communication server. If not, at 854, a power off report is not sent. Either way, the process proceeds to block 856 where it is determined whether a low battery level is detected. If yes, at 858, a low battery report is sent to a communication server. If not, at 860, a low battery report is not sent to the communication server. In some cases, both a power off report and a low battery report may be sent to the communication server. In some embodiments, the reason for the offline state in the automated reply message can include both intentional power off and low battery. In this way, the sender can understand that the intended recipient likely turned off his/her mobile device because the battery was low.

Disclosed embodiments provide improvements to the technical field of electronic communication. An automated reply is sent to a sender electronic device to inform the sender about an offline status of an electronic mobile device associated with an intended recipient. This allows the sender to quickly ascertain that the recipient is unable to respond at the current time. This avoids the manual tasks of responding to "Where were you?", and "Why didn't you answer?" and also avoids the repetitive tasks of sending apologies once cell service is restored. Additionally, the sender knows not to continue trying to establish communication until a later time. This reduces network congestion, and saves battery life and other resources on the sending electronic device.

As can now be appreciated, disclosed embodiments provide techniques for generating an electronic communication response for a mobile electronic device in an offline state. A communication server detects various offline conditions, such as explicitly powered off, low/dead battery, dead zone location, and/or other reasons. Disclosed embodiments can work with a variety of communication types, including, but not limited to, voice, text messaging, and/or instant messaging. A sending electronic device, attempting to establish communication with a receiving electronic device that is offline receives an automated reply message from the communication server, indicating that the intended receiving electronic device is offline. In embodiments, an estimated online restoration time for the receiving electronic device is derived and included in the automated reply message. Additionally, a reason for the offline condition such as explicitly powered off, low/dead battery, dead zone location, and/or other reason may also be included in the automated reply message. The automated reply message can be text based, or voice based, in the form of a recorded message provided to the sending electronic device. In this way, network congestion is reduced, and battery life and other resources on the sending electronic device is saved.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for generating an electronic communication response, comprising:
   determining an offline state of a receiving electronic device located in an area where there is a signal disruption;
   receiving a communication request from a sending electronic device that is destined for the receiving electronic device;
   identifying an estimated repair time;
   estimating an online restoration time based on the estimated repair time;
   comparing a phone number of the sending electronic device to a contact list of the receiving electronic device;
   determining, based on the comparing, that a contact entry associated with the sending electronic device is included in a subset of contacts, in the contact list of the receiving electronic device;
   determining that a customized preset message was set by the receiving electronic device for the subset of contacts;
   providing an option for a user of the sending electronic device to abort sending the communication request to the receiving device;
   receiving a selection not to abort;
   sending an electronic message to the receiving electronic device; and
   receiving an automated reply message at the sending electronic device, wherein the automated reply message includes the offline state of the receiving electronic device, the customized preset message, and the estimated online restoration time.

2. The method of claim 1, wherein the identified estimated repair time is obtained from a service provider.

3. The method of claim 1, wherein receiving a communication request comprises receiving a voice call.

4. The method of claim 1, wherein receiving a communication request comprises receiving a text message.

5. The method of claim 1, wherein receiving a communication request comprises receiving an instant chat message.

6. The method of claim 1, further comprising determining, based on the comparing, a name associated with the contact entry.

7. The method of claim 6, wherein the automated reply message further comprises the name.

8. An electronic communication device comprising:
   a processor;
   a memory coupled to the processor, the memory containing instructions, that when executed by the processor, perform the steps of:
   determining an offline state of a receiving electronic device located in an area where there is a signal disruption;
   receiving a communication request from a sending electronic device that is destined for the receiving electronic device;
   identifying an estimated repair time;

estimating an online restoration time based on the estimated repair time;

comparing a phone number of the sending electronic device to a contact list of the receiving electronic device;

determining, based on the comparing, that a contact entry associated with the sending electronic device is included in a subset of contacts, in the contact list of the receiving electronic device;

determining that a customized preset message was set by the receiving electronic device for the subset of contacts;

providing an option for a user of the sending electronic device to abort sending the communication request to the receiving device;

receiving a selection not to abort;

sending an electronic message to the receiving electronic device; and receiving an automated reply message at the sending electronic device, wherein the automated reply message includes the offline state of the receiving electronic device, the customized preset message, and the estimated online restoration time.

9. The electronic communication device of claim 8, wherein the identified estimated repair time is obtained from a service provider.

10. The electronic communication device of claim 8, wherein receiving a communication request comprises receiving a voice call.

11. The electronic communication device of claim 8, wherein receiving a communication request comprises receiving a text message.

12. The electronic communication device of claim 8, wherein receiving a communication request comprises receiving an instant chat message.

13. The electronic communication device of claim 8, wherein the memory further comprises instructions, that when executed by the processor, perform the steps of:

determining, based on the comparing, a name associated with the contact entry.

14. The electronic communication device of claim 13, wherein the automated reply message further comprises the name.

15. A computer program product for an electronic communication device comprising a computer readable hardware storage device having program instructions embodied therewith, the program instructions executable by a processor to cause the electronic communication device to:

determine an offline state of a receiving electronic device located in an area where there is a signal disruption;

receive a communication request from a sending electronic device that is destined for the receiving electronic device;

identify an estimated repair time;

estimate an online restoration time based on the estimated repair time;

compare a phone number of the sending electronic device to a contact list of the receiving electronic device;

determine, based on the comparing, that a contact entry associated with the sending electronic device is included in a subset of contacts, in the contact list of the receiving electronic device;

determine that a customized preset message was set by the receiving electronic device for the subset of contacts;

provide an option for a user of the sending electronic device to abort sending the communication request to the receiving device;

receive a selection not to abort;

send an electronic message to the receiving electronic device; and receive an automated reply message at the sending electronic device, wherein the automated reply message includes the offline state of the receiving electronic device, the customized preset message, and the estimated online restoration time.

16. The computer program product of claim 15, wherein the identified estimated repair time is obtained from a service provider.

17. The computer program product of claim 15, wherein receiving a communication request comprises receiving a voice call.

18. The computer program product of claim 15, wherein receiving a communication request comprises receiving a text message.

19. The computer program product of claim 15, wherein receiving a communication request comprises receiving an instant chat message.

20. The computer program product of claim 19, wherein the computer readable hardware storage device includes program instructions executable by the processor to cause the electronic communication device to:

determine, based on the comparing, a name associated with the contact entry; and wherein the automated reply message further comprises the name.

* * * * *